United States Patent
Owen

(10) Patent No.: US 8,085,891 B2
(45) Date of Patent: Dec. 27, 2011

(54) SYSTEM AND METHOD FOR MANAGEMENT OF MOBILE DEVICE COMMUNICATION

(75) Inventor: Russell Owen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 915 days.

(21) Appl. No.: 11/420,789

(22) Filed: May 29, 2006

(65) Prior Publication Data
US 2007/0275745 A1 Nov. 29, 2007

(51) Int. Cl.
*H04L 7/00* (2006.01)
(52) U.S. Cl. ........ 375/354; 455/415; 455/558; 709/219; 709/228
(58) Field of Classification Search .................. 375/272, 375/354; 455/415, 456.1, 502, 517, 558; 709/228
See application file for complete search history.

(56) References Cited

U.S. PATENT DOCUMENTS

| | | | |
|---|---|---|---|
| 6,032,051 A | 2/2000 | Hall et al. | |
| 6,167,123 A * | 12/2000 | Kwok et al. | 379/100.01 |
| 6,272,545 B1 * | 8/2001 | Flanagin et al. | 709/228 |
| 2003/0157947 A1 * | 8/2003 | Fiatal et al. | 455/466 |
| 2005/0079873 A1 * | 4/2005 | Caspi et al. | 455/456.1 |
| 2005/0153741 A1 * | 7/2005 | Chen et al. | 455/558 |
| 2005/0165914 A1 | 7/2005 | Moore et al. | |
| 2006/0052091 A1 * | 3/2006 | Onyon et al. | 455/415 |
| 2007/0147175 A1 * | 6/2007 | Punkka | 368/21 |
| 2007/0288548 A1 * | 12/2007 | Creamer et al. | 709/202 |
| 2008/0261636 A1 * | 10/2008 | Lau et al. | 455/466 |

FOREIGN PATENT DOCUMENTS

| | | |
|---|---|---|
| EP | 1054571 A | 11/2000 |
| EP | 1309211 A | 5/2003 |
| EP | 1534026 A | 5/2005 |

* cited by examiner

*Primary Examiner* — David C. Payne
*Assistant Examiner* — Leon-Viet Nguyen
(74) *Attorney, Agent, or Firm* — Jenna L. Wilson; Dimock Stratton LLP

(57) ABSTRACT

A system and method for managing mobile device communication in an enterprise includes a device management agent and a synchronization agent in the mobile device. Information about the status of the mobile device is collected by the device management agent and the synchronization agent communicates the status information to the enterprise with which the mobile device is associated. A synchronization server at the enterprise collects device information and updates records at the enterprise. Information such as device telephone number is propagated to the enterprise directory and potentially to a PBX to ensure connectivity with the mobile device.

16 Claims, 3 Drawing Sheets

SYSTEM AND METHOD FOR MANAGEMENT OF MOBILE DEVICE COMMUNICATION

TECHNICAL FIELD

The present invention relates generally to communication systems and more specifically to a system and method for the management of communication with mobile devices in such systems.

BACKGROUND

Wireless mobile communication devices are in increasing use and the ability to ensure continued connectivity for users is of increasing importance. To aid in management of mobile device communication, it is desirable for users of such devices within an enterprise to have identification and communication information stored in a manner that permits the information to be accessible and current.

One example of such identification and communication information relates to telephone numbers assigned to mobile communication devices. Wireless devices such as mobile telephones typically make use of a SIM (Subscriber Identity Module) component to identify the device to the wireless network that the device uses for communication. A user may change the SIM in a mobile communication device to allow the user to use a network in a different geographic region. This change in SIM is one way to permit device "roaming". If a wireless user moves to an area where a first communication carrier's wireless network does not reach, or where the cost for access to that carrier's network becomes unacceptable, the wireless user may replace a first SIM with a SIM for another wireless network.

In wireless communication devices that include both e-mail and telephone functionality, a change of SIM will not necessarily change the e-mail address for the device, but it will result in a change in the telephone number that is assigned to the device. As a result, attempts to communicate with the mobile device with a new SIM by telephone may fail. Information available to other employees of an enterprise of to non-employees may be out of date or temporarily inaccurate.

As will be appreciated, there is often other status information about a mobile communication device that is useful in management of communication to the device. Status information concerning the location of the device may be usable for communication management, for example, if such information indicates that the device is in a particular time zone or if it indicates that the device is in a cradle at a workstation. Other dynamic network identifier information may also be useful status information for the device, for example, an IP address assigned to a handset.

It is therefore desirable to provide a system and method for the management communications relating to mobile devices which is based on status information being made available by the devices.

BRIEF DESCRIPTION OF THE DRAWINGS

In drawings which illustrate by way of example only a preferred embodiment of the invention.

DETAILED DESCRIPTION

One aspect of the system and method described provides for an improved system and method for managing communication using status information pertaining to mobile communication devices.

According to an aspect of the preferred embodiment, there is provided a method and system in which a wireless communication device communicates device status to a server at an enterprise to ensure that correct and timely information about the device is maintained in device management data at the enterprise. According to another aspect of the invention, a wireless communication device is provided with a device management agent and a synchronization agent to enable the communication of device status to be carried out.

Figure 1:
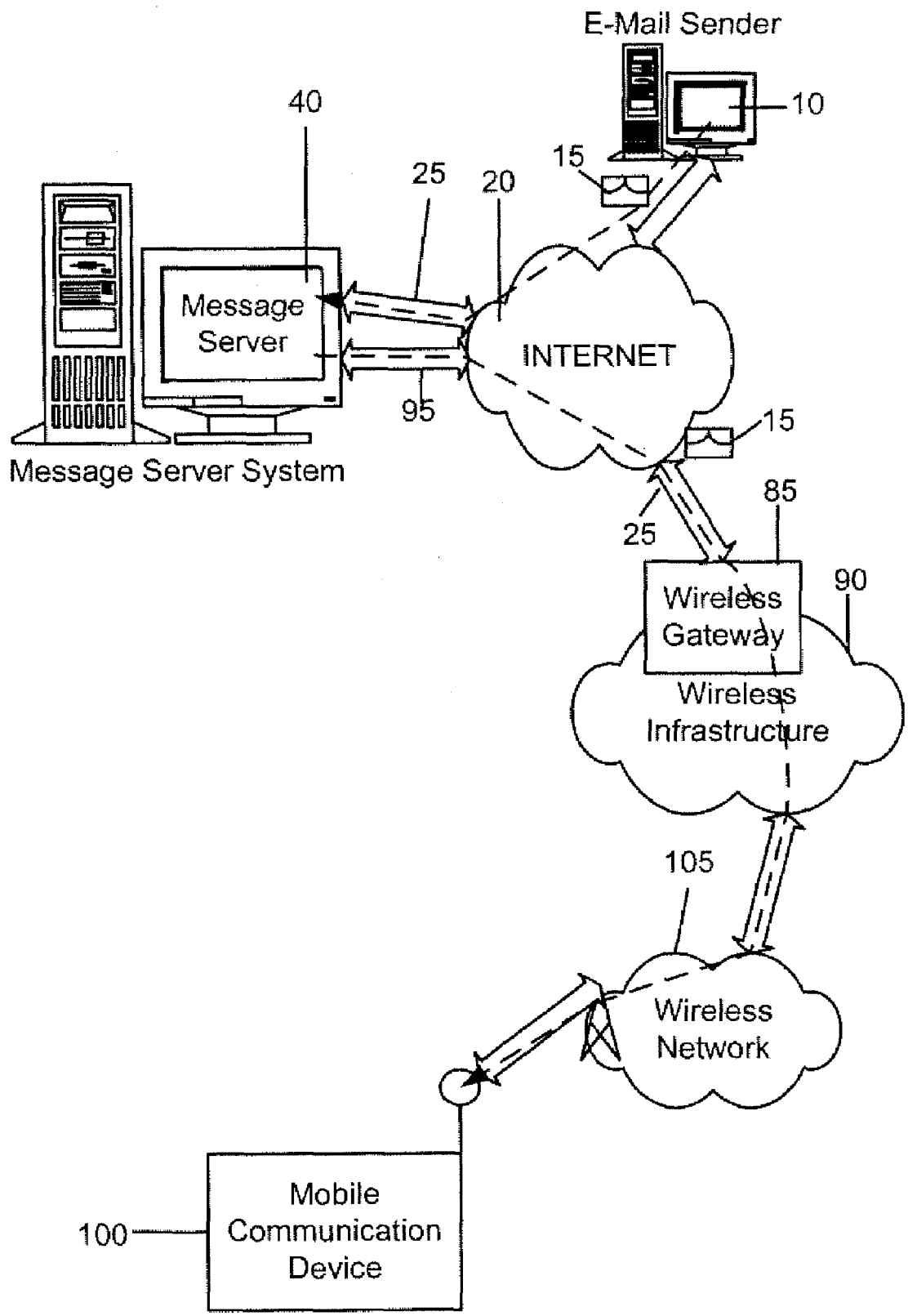
FIG. 1 is an overview of an example communication system in which a wireless communication device may be used.

Advantages of the preferred embodiment include the ability to automatically propagate status information relating to a mobile communication device to an enterprise-based server to allow decisions to be made in communication management, such as routing decisions. Advantages of the preferred embodiment include the ability to update telephone numbers (or other dynamic network identifiers) in an enterprise directory or database when a change has occurred for a mobile communication device (such as the use of a different SIM card on a mobile device). Advantages also include the ability to update a PBX (Private Branch Exchange) to allow a change in telephone number to be tracked when a forwarding feature is in use in the PBX FIG. 1 is an overview of an example communication system in which a mobile communication device may be used. One skilled in the art will appreciate that there may be other different topologies, but the system shown in FIG. 1 helps demonstrate the operation of the secure message processing systems and methods described in the present application. There may also be many message senders and recipients. The simple system shown in FIG. 1 is provided for illustrative purposes.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile communication device 100 configured for receiving and possibly sending e-mail will normally be associated with an account on a message server. Perhaps the two most common message servers are Microsoft Exchange™ and Lotus Domino™. Such products are often used in conjunction with Internet mail routers that route and deliver mail. These intermediate components are not shown in FIG. 1, as they do not directly play a role in the message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile communication device 100 via wireless transmission, typically at a radio frequency (RF), from a base station in the wireless network 105 to the mobile communication device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are known to those skilled in the art. The message 15 arrives at the message server 40 and is normally stored in a message store. In a preferred embodiment described in further detail below, messages addressed to a message server account associated with a host system such as a home computer or office computer which belongs to the user of a mobile communication device 100 are redirected from the message server 40 to the mobile communication device 100 as they are received.

Regardless of the specific mechanism controlling the forwarding of messages to the mobile communication device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
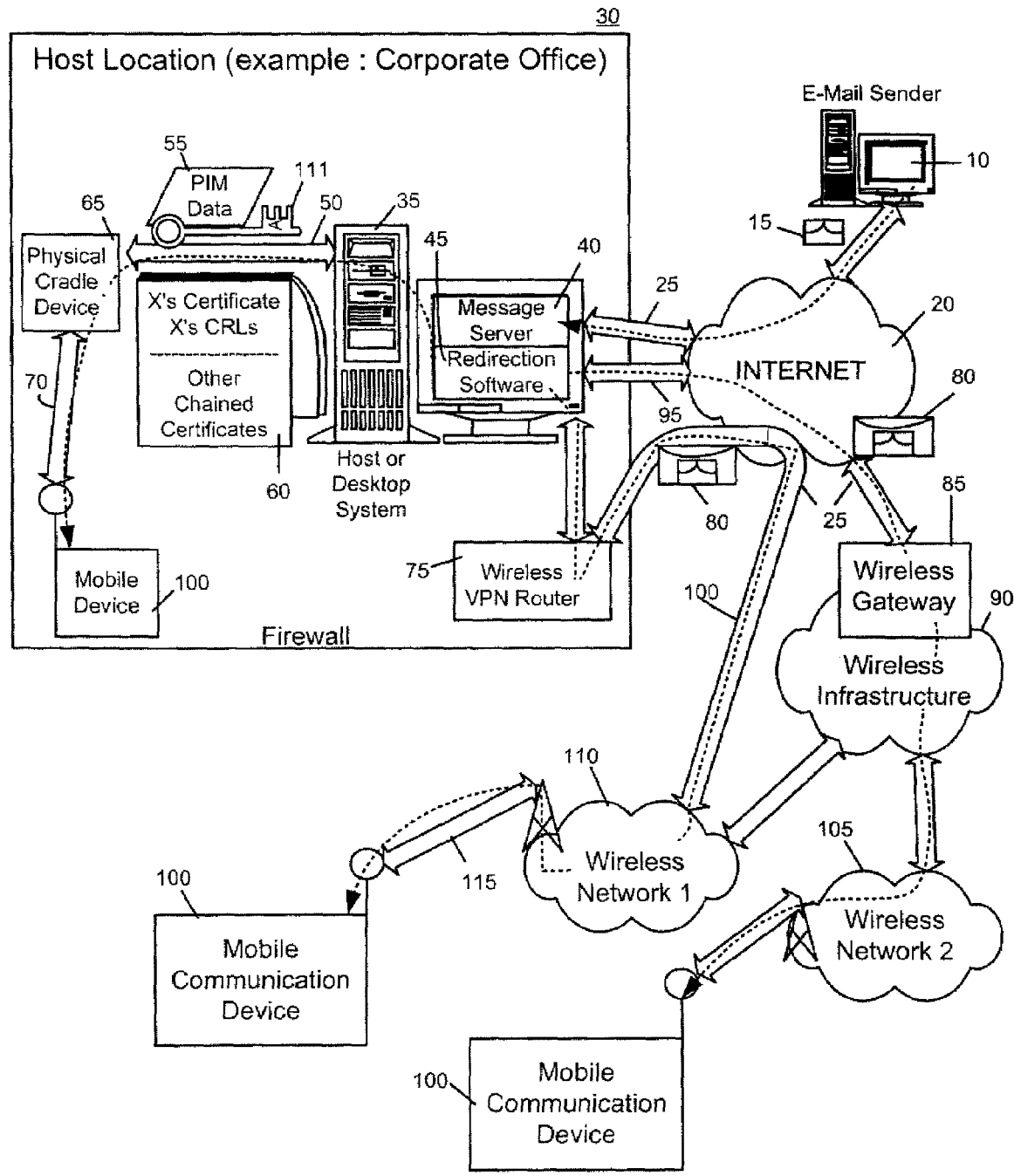
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on a computer within the firewall of the host system that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile communication device 100 associated with the host system 30.

As shown in FIG. 2, there may be many alternative paths for getting information to the mobile communication device 100. One method for loading information onto the mobile communication device 100 is through a port designated 50, using a device cradle 65. This method tends to be useful for bulk information updates often performed at initialization of a mobile communication device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. A VPN connection could be established directly through a specific wireless network 110 to a mobile communication device 100. The possibility of using a wireless VPN router 75 is contemplated to be used with Internet Protocol (IP) Version 6 (IPV6) on IP-based wireless networks. This protocol will provide enough IP addresses to dedicate an IP address to every mobile communication device 100 and thus make it possible to push information to a mobile communication device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile communication device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile communication device 100. As this redirection takes place the message 15 is re-enveloped, as indicated at 80, and a possibly proprietary compression and encryption algorithm can then be applied to the original message 15. In this way, messages being read on the mobile communication device 100 are no less secure than if they were read on a desktop workstation such as 35 within the firewall. All messages exchanged between the redirection program 45 and the mobile communication device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile communication device 100 allows the received message to appear as though the message originated from the user's desktop system 35 rather than the mobile communication device 100.

With reference back to the port 50 and cradle 65 connectivity to the mobile communication device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile communication device 100 where it can be used on the road. This serial link may also be used for other purposes, including setting up a private security key 111 such as an S/MIME or PGP (Pretty Good Privacy data encryption) specific private key, the Certificate (Cert) of the user and their Certificate Revocation Lists (CRLs) 60. The private key is preferably exchanged so that the desktop 35 and mobile communication device 100 share one personality and one method for accessing all mail. The Cert and CRLs are normally exchanged over such a link because they represent a large amount of the data that is required by the device for S/MIME, PGP and other public key security methods.

As will be appreciated from the above description, mobile communication device 100 is usable to communicate using wireless data networks to permit e-mail and related data to be exchanged (as is shown for e-mailer sender 10 in FIGS. 1 and 2). Further, mobile communication device 100 is usable for voice communication using wireless data networks which permit the device to be operated as a telephone with an assigned telephone number. Although FIGS. 1 and 2 primarily show data communication paths between devices, mobile devices 100 may communicate with each other, and with other devices, using wireless networks for voice communication. This communication takes place over conventionally-defined wireless voice networks as are supported by mobile communication device 100.

As will be appreciated, and as is described in further detail below, the identifying characteristics of mobile communication device 100, such as an assigned telephone number or other dynamic network identifiers (such as an IP address), may change over time. In the preferred embodiment, an initialization or change to such an identifying characteristic is handled at a host location so as to permit dissemination of the identifying characteristic to particular users of the communication network.

This aspect of the preferred embodiment is described with reference to the example shown in the block diagram of FIG. 3. The figure shows a selected subsystem of mobile communication device 100. In current wireless remote communication systems there are different types of devices, such as a personal digital assistant, a smart phone or a wireless hand-held device, each of which may potentially be employed as mobile communication device 100 as shown in this description of the preferred embodiment. Different networks may also be employed to allow the device to communicate. In the preferred embodiment the mobile communication device 100 is used by a person who is considered to be part of a defined organization or enterprise, as described further below.

Figure 3:
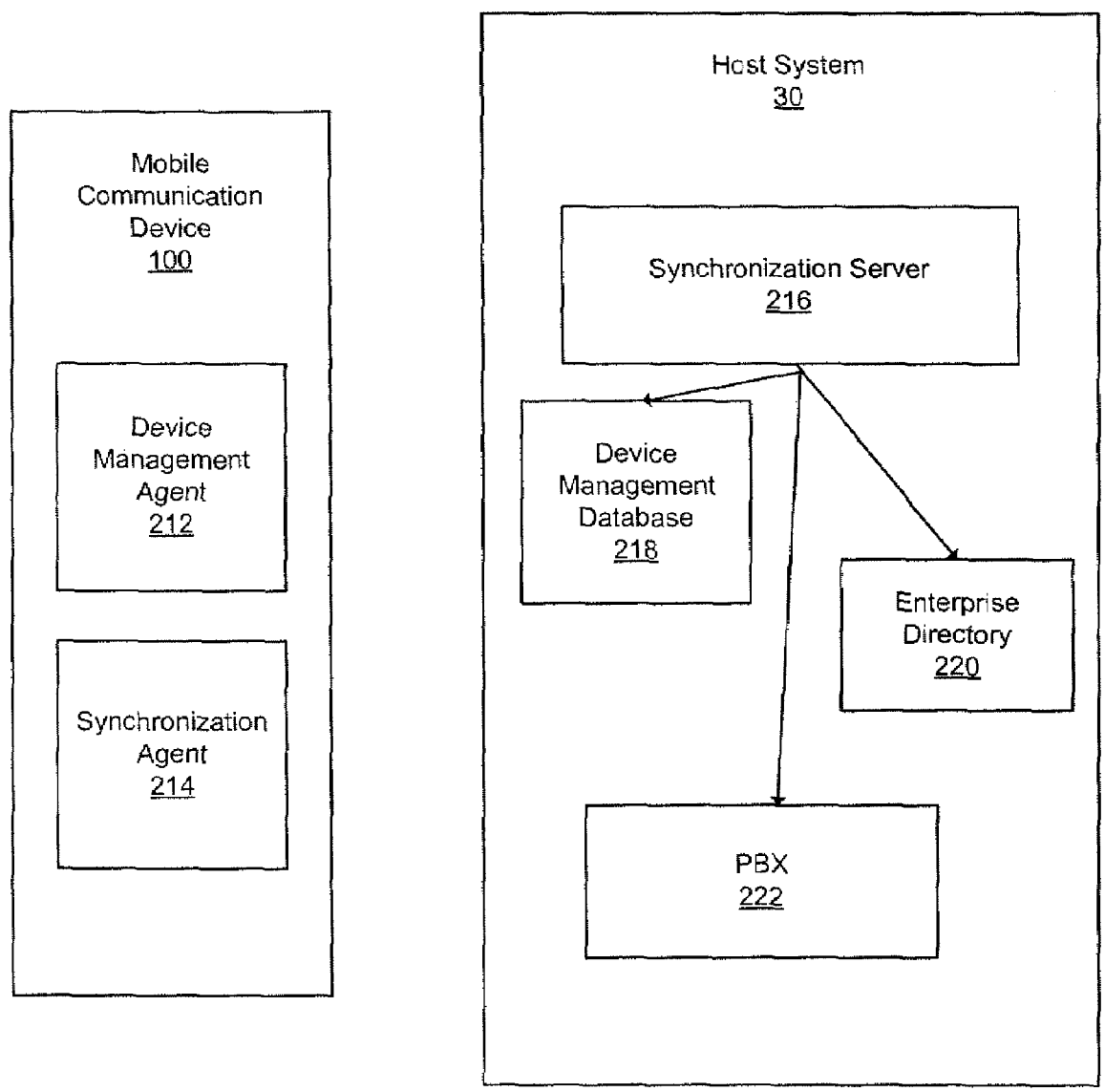
FIG. 3 is a block diagram showing a high-level representation of an example arrangement of a mobile communication device and enterprise system components according to the preferred embodiment.

Mobile communication device 100 in FIG. 3 is shown as comprising a subsystem having device management agent 212 and synchronization agent 214. The functions of these agents are set out in more detail below. In the preferred embodiment these agents are implemented as program code that is executable by mobile communication device 100 and is operative to carry out defined functions on mobile communication device 100. The preferred embodiment may be implemented as a computing device program product, or as a portion of such a product, that includes program code operative in whole or in part on mobile communication device 100 and/or on computing devices at a host system 30 to carry out steps in the process described below. Such a computing-device program product may be embodied in, and delivered to an intended computing device by, signals carried by networks, including the Internet, or may be embodied in media such as magnetic, electronic or optical storage media. The process described may be carried out by a combination of one or more of executable code, firmware and hardware in a computing device.

It will be appreciated by those skilled in the art that the functions of agents 212 and 214 may be implemented by way of one or more of program code, hardware or firmware. In the preferred embodiment these functional components are referred to as agents but other computing device elements operative to carry out the functionality of agents 212, 214 and the components in host system 30 may be provided, as is appreciated by those skilled in the art. In the description, synchronization agent 214 is described as forwarding information to host system 30. As will be appreciated, the various communications systems referred to in FIGS. 1 and 2 are potentially available to mobile communication device 100 and the forwarding of information by synchronization agent 214, and the receipt of such information by host system 30, is carried out using such communications systems as referred to above.

FIG. 3 shows enterprise components that are, in the preferred embodiment, implemented at a host system 30. In the preferred embodiment, host system 30 is located at a single location in an enterprise. It is understood by those skilled in the art that the components in host system 30 shown in FIG. 3 may be outsourced or otherwise provided at a location remote from host system 30. The functionality described below for the components shown in host system 30 in FIG. 3 are provided so as to be available to the enterprise, as is described in more detail below.

FIG. 3 shows synchronization server 216, device management database 218, enterprise directory 220, and PBX 222 in host system 30. Host system 30 is, in the preferred embodiment, associated with a particular enterprise. It is understood that the enterprise will have available to it system resources that will carry out some or all of the functions as described below with reference to synchronization server 216, device management database 218, enterprise directory 220 and PBX 222. For example, the preferred embodiment is described with reference to the separate component device management database 218. However, an alternative embodiment may provide for handling of device management data as an integral aspect of synchronization server 216 and not as a separate component as is suggested in FIG. 3 with reference to the preferred embodiment.

In operation, mobile communication device 100 contains a processor able to run executable code implementing device management agent 212. Device management agent 212 is operative to interrogate the mobile communication device itself and obtain device status information. Examples of such information include memory usage, memory availability and application status. In the preferred embodiment, such information includes mobile device status information usable for managing communication to the device, such as the telephone number assigned to mobile communication device 100. Other status information such as "off-hook" or "in-cradle" may also be obtained by device management agent 212 interrogating the device. In the preferred embodiment, such state information is able to be stored by device management agent 212 in memory on the device. As will be appreciated, mobile communication device 100 may also include other executable code operative to obtain and/or store status information in memory on the device independently of device management agent 212. The preferred embodiment is designed, however, to use device management agent 212 to collect and store potentially usable device status information.

As shown in the FIG. 3 representation of the preferred embodiment, mobile communication device 100 also includes synchronization agent 214. Synchronization agent 214 is computing device executable code operative to manage device status information collected and stored by device management agent 212 so as to synchronize this information with records maintained by an enterprise associated with the mobile communication device 100. Such an enterprise is typically a business, government or academic organization but may include any defined set of users having a common set of characteristics and who are identifiable to each other. For example, defined user groups or on-line communities may be considered enterprises in the sense used in this description. As is described with reference to the preferred embodiment, the enterprise includes accessible data for storing communication information relating to one or more mobile communication devices 100. As is described in more detail below, such information is dynamic and the enterprise includes processes for updating such information in data memory accessible by host system 30.

According to the preferred embodiment, when a change in device status for mobile communication device 100 is detected (as described below), synchronization agent 214 initiates a synchronization operation to provide for the updating of data maintained by the enterprise in host system 30. In the preferred embodiment, synchronization agent 214 uses the wireless communication capability of mobile communication device 100 to communicate device status information to synchronization server 216.

An example of the operation of agents 212 and 214 on mobile communication device 100 is given when a SIM for the device is exchanged for a different SIM. Such a change will be desirable when, for example, mobile communication device 100 is moved from a region having a first wireless network to a region with a different wireless network. In some cases, a first SIM will function in the first region but not in the second, requiring a second SIM to be installed in mobile communication device 100. As will be appreciated by those skilled in the art, the first and second SIMs will be assigned different telephone numbers.

According to the preferred embodiment, device management agent 212 is operative to periodically interrogate the SIM installed in mobile communication device 100. When device management agent 212 interrogates a newly installed SIM it is operative to determine that there is a new telephone number for the device (by comparing the number for the new SIM with a previously-stored record of the telephone number associated with mobile communication device 100). According to the preferred embodiment, device management agent 212 stores this new telephone number (obtained by interrogating the new SIM) in the device status data stored on device 100. In the preferred embodiment, device management agent 212 will then trigger execution by synchronization agent 214 and will provide synchronization agent 214 with the relevant details of the change in status information for device 100 (the new telephone number in the case of this example). Consequently, synchronization agent 214 communicates the new telephone number for device 100 to synchronization server 216 in host system 30, along with other information usable to permit proper updating of enterprise records, if any.

Alternatively, upon detecting a new SIM on interrogating the device, device management agent 212 may merely update the data on device 100 that reflects device status information, without directly initiating operation of synchronization agent 214. In such an arrangement, operation of synchronization agent 214 will either be triggered by another defined event (for example, replacing mobile communication device 100 in a holster or in a cradle) or may be initiated by a timeout or some other periodic event selectable by an administrator or user of mobile communication device 100.

As will be appreciated, other status information for mobile communication device 100 may be tracked, stored and forwarded to host system 30 in a manner analogous to that described for telephone number status information in the example. Such status information for mobile communication device 100 may include the physical location of the device as may be obtained by a global positioning service or information as to whether mobile communication device 100 is in physical cradle device 65, or not. Other dynamic network identifiers (such as a personal identification number assigned by a network administrator, or such as an IP address) may also be treated in a similar fashion.

Turning to enterprise components that may be located in host system 30, the preferred embodiment configuration includes device management database 218. This database includes records reflecting the devices usable by those associated with the enterprise (for example, by employees of, or contractors retained by, a corporation). When synchronization server 216 receives device status information from mobile communication device 100 (due to operation of synchronization agent 214), the information is stored in the appropriate record in device management database 218 relating to device 100. In the example above, when a SIM for (and hence the telephone number assigned to) mobile communication device 100 is changed and a new telephone number is sent to host system 30 by synchronization agent 214, synchronization server 16 is operative to enter the new telephone number in device management database 218 in the appropriate data record associated with the user of mobile communication device 100.

The block diagram of FIG. 3 also shows that synchronization server 216 interoperates with both enterprise directory 220 and PBX 222. In an alternative embodiment, the information from mobile communication device 100 can be stored by synchronization server 216 only in device management database 218, and other applications are then able to access the information as stored in the database to permit the tailoring of communication with mobile communication device 100.

In the arrangement shown in FIG. 3, synchronization server 216 may copy status information about mobile communication device 100 to enterprise directory 220. Thus a change in telephone number communicated by synchronization agent 214 will be recorded in enterprise directory 220. The result is that when a SIM is changed in mobile communication device 100, for example, the new telephone number for the device is recorded in a directory and calls to the device which rely on information in enterprise directory 220 will be successful.

FIG. 3 also shows PBX 222 that is also able to receive information about mobile communication device 100 by operation of synchronization server 216. With respect to the change in telephone number referred to above, if the user of device 100 wishes to forward calls directed to his or her line in the PBX to the mobile device, the new telephone number may be automatically entered in PBX 222 by synchronization server 216. In the preferred embodiment, an administrator may use an interface provided for synchronization server 216 to specify communication preferences for the user of mobile communication device 100. Alternatively, some or all users of such mobile communication devices 100 may be provided with the ability to define such communication management preferences. Synchronization server 216 will accordingly be operative to receive status information and to update records and communication permissions at host system 30 in accordance with the defined communication management preferences so defined by an administrator or user.

As is suggested above, status information from mobile communication device 100 may relate to the physical location of the device (using a Global Positioning Service, for example), or whether the device is in a cradle or not. This information, when propagated to the enterprise by operation so synchronization agent 214 and synchronization server 216, may be used to route communications to the user of mobile communication device 100 in accordance with the defined preferences for the user. For example, if the mobile communication device is in cradle 65, this status information can be communicated by synchronization server 216 to the appropriate components in host system 30 (for example PBX 222) so as to route telephone calls to a telephone extension of the user in an exchange within the enterprise, rather than to the mobile device.

The preferred embodiment also provides for users associated with the enterprise to register one or more interests in other devices or users in the enterprise. As is referred to above with respect to the management of communications in accordance with specified user preferences, an administrator may register such interests or users may be provided with the ability to specify such an interest directly. In either case, according to the preferred embodiment, such an interest may be registered using synchronization server 216. According to the preferred embodiment, the interest is recorded in device management database 218.

Accordingly, when status information is received by synchronization server 216, the server will determine, using device management database 218, whether there is a registered interest in the mobile communication device relating to the received status information. When the records of device management database 218 indicate that there is such an interest, synchronization server 216 will forward the status information to a device relating to the registered interest. According to the preferred embodiment, users of mobile communication devices may use device management agent 212 to register such an interest. In addition, synchronization agent 214 and device management agent 212 are defined to receive and to process, respectively, status information regarding the device of interest received from synchronization server.

For example, a first user may register a first device as being interested in a second device. When there is a SIM change for the second device, synchronization server 216 forwards the new telephone number for the second device to the first device where the new telephone number can be added to, or used to update, an address book maintained on the first device. Synchronization agent 214 is operative to receive the new telephone number information and pass it to device management agent 212, which is operative to update an address book maintained in mobile communication device 100.

As will be appreciated, this type of interest registration may be used to provide other types of communication management. For example, using the process described above, a warning notice may be given to a user who attempts to initiate a telephone call to a mobile communication device when that device is in a time zone where it is no longer business hours. The user attempting to make the telephone call may register and interest in the time zone status information for the target device and synchronization server 216 may forward such information to the device for the calling user which information can be used by that device to display an appropriate warning to the calling user prior to the call being placed.

In this way, changes in the status information for a mobile communication device can be communicated to another device, on request. In the preferred embodiment synchronization server 216 provides an interface to permit a system administrator to define relationships between users and/or devices so that changes in device status information will be propagated from the enterprise to the other devices according to the defined relationships. For example, the current telephone numbers for all directly reporting staff may be updated on the address books of devices for the managers for those direct reports. The information flow and processing for device management agent 212 and synchronization server 216 may be defined based on the structure of the enterprise, with rules for propagation of status information being defined based on the assignment of mobile communication devices within the enterprise.

Other functionality and management capabilities may be defined for the enterprise using synchronization server 216 and the interaction with synchronization agent 214. Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

What is claimed is:

1. A system, comprising:
   a first mobile communication device comprising:
   a first device management agent configured to detect changed device status information for the first mobile communication device; and a first synchronization agent configured to obtain the changed device status information from the device management agent and to communicate said changed device status information to a synchronization server, wherein the changed device status information is time zone information;

a second mobile communication device comprising:
a second synchronization agent configured to receive updated information from the synchronization server; and
a second device management agent configured to receive said updated information from the second synchronization agent and to update a data store maintained at the second mobile communication device with said updated information,
wherein the second mobile communication device is configured to, upon initiation of a telephone call to the first mobile communication device, provide a warning based on said time zone information; and the synchronization server, said synchronization server being configured to:
receive the changed device status information from the first synchronization agent in a synchronization operation; and
in response to receipt of said changed device status information, provide said updated information to the second synchronization agent of the second mobile communication device.

2. The system of claim 1, wherein the synchronization server is further configured to provide said received changed device status information for storage in an enterprise store.

3. The system of claim 1, wherein the synchronization server is further configured to provide said updated information to the second synchronization agent in a further synchronization operation.

4. The system of claim 1, wherein the changed device status information is an updated telephone number.

5. The system of claim 4, wherein the synchronization server is further configured to update a PBX with said updated telephone number.

6. The system of claim 1, wherein at least one of the first mobile communication device and the second mobile communication device is configured to communicate with the synchronization server over a wireless network.

7. The system of claim 1, wherein the data store maintained at the second mobile communication device is an address book.

8. The system of claim 1, wherein the synchronization server is configured to provide said updated information to the second synchronization agent of the second mobile communication device upon determination that said second mobile communication device has registered an interest in said updated information of the first mobile communication device.

9. A method, comprising:
detecting, by a first device management agent at a first mobile communication device, a change in device status information for said first mobile communication device wherein the changed device status information is time zone information for the first mobile communication device;
providing, by the first device management agent, said changed device status information to a first synchronization agent at the first mobile communication device;
communicating said changed device status information by the first synchronization agent to a synchronization server in a synchronization operation;
providing, by the synchronization server in response to receipt of said changed device status information, updated information for said first mobile communication device to a second synchronization agent at a second mobile communication device;
receiving, by a second device management agent at the second mobile communication device, said updated information from the second synchronization agent;
providing, by the second mobile communication device upon initiation of a telephone call to the first mobile communication device, a warning based on said time zone information; and
updating, by the second device management agent, a data store maintained at the second mobile communication device with said updated information.

10. The method of claim 9, further comprising the synchronization server providing said received changed device status information for storage in an enterprise store.

11. The method of claim 9, wherein said providing, by the synchronization server, said updated information to the second synchronization agent is carried out in a further synchronization operation.

12. The method of claim 9, wherein the changed device status information is an updated telephone number.

13. The method of claim 12, further comprising the synchronization server updating a PBX with said updated telephone number.

14. The method of claim 9, wherein at least one of the first mobile communication device and the second mobile communication device is configured to communicate with the synchronization server over a wireless network.

15. The method of claim 9, wherein the data store maintained at the second mobile communication device is an address book.

16. The method of claim 9, further comprising the synchronization server determining that the second mobile communication device has registered an interest in said updated information of the first mobile communication device prior to said providing of said updated information to the second synchronization agent.

* * * * *